United States Patent
Vardanyan et al.

[19]

[11] Patent Number: 6,079,621
[45] Date of Patent: Jun. 27, 2000

[54] SECURE CARD FOR E-COMMERCE AND IDENTIFICATION

[75] Inventors: Arthur Vardanyan, Ottawa; Wayne Reed, Kemptville; Gordon Freedman, Nepean, all of Canada

[73] Assignee: Chrysalis-ITS Inc., Ottawa, Canada

[21] Appl. No.: 09/189,675

[22] Filed: Nov. 13, 1998

[51] Int. Cl.[7] .................................................... G06K 19/00
[52] U.S. Cl. ........................ 235/487; 235/493; 235/449; 235/494
[58] Field of Search ................................. 235/487, 493, 235/492, 380, 382, 449, 375, 494

[56] References Cited

U.S. PATENT DOCUMENTS

| | | | |
|---|---|---|---|
| 4,114,029 | 9/1978 | Lee ............................................. | 235/449 |
| 4,745,267 | 5/1988 | Davis et al. ............................... | 235/379 |
| 4,982,076 | 1/1991 | Fujita ........................................ | 235/493 |
| 5,424,523 | 6/1995 | Ohno et al. ............................... | 235/449 |
| 5,698,839 | 12/1997 | Jagielinski et al. ..................... | 235/493 |
| 5,777,903 | 9/1978 | Piosenka et al. ........................ | 364/700 |

*Primary Examiner*—Donald Hajec
*Assistant Examiner*—Daniel St. Cyr
*Attorney, Agent, or Firm*—Gordon Freedman; Neil Teitelbaum

[57] ABSTRACT

A secure card such as a credit card having a magnetic strip thereon is disclosed. The magnetic strip is coated with a thin amorphous layer having electrical characteristics and a processor. In a first state, the amorphous layer acts to interfere with reading of information from the magnetic strip. Identification of a user of the card as an authorized user thereof results in a second state in which the information stored in the magnetic strip is accessible. For example, biometric identification or the use of a PIN entered either directly into the card or through an input terminal cause the processor to switch power from the amorphous strip thereby removing the interference and unmasking the information on the magnetic strip.

23 Claims, 4 Drawing Sheets

Electric Field

6,079,621

SECURE CARD FOR E-COMMERCE AND IDENTIFICATION

FIELD OF INVENTION

The present invention relates to cards having magnetic strips and more particularly to a card having a magnetic strip containing secure information.

BACKGROUND OF INVENTION

Cards with magnetic strips have become commonplace. Credit cards are a common and widely distributed form of card having a magnetic strip. On the magnetic strip of a credit card is stored information relating to the credit card such as information shown on the front of the card. This allows entry of credit card information by a simple "swipe" of the credit card through a magnetic strip reader. Because of their programmability, low cost, and simplicity of use, storage of information on magnetic strips is popular. For example, cards having magnetic strips are now used in doorway access applications, credit cards, INTERAC cards, identification cards and so forth.

Unfortunately, those same features that make the use of cards having magnetic strips thereon so widespread also limits their use. For example, ease of writing and reading magnetic strip information makes it undesirable to store confidential information on a magnetic strip. Also, it is difficult to increase security of doorways accessed by magnetic strips. The problem is exemplified by the ease with which credit cards are stolen and used by unauthorised users.

Many methods of avoiding these problems are known. Most of these methods relate to two particular problems. Both these problems relate to fraudulent use of a card. For example, some cards with magnetic strips are provided with a picture of an authorised user of the card. This allows someone accepting the card to visually verify that the user of the card is authorised to do so. For credit cards and for business doorways where security staff are already present this is very useful. Unfortunately, absent a human to verify the user and the image on the card, no improved security results. Another form of fraud prevention encodes a card with a counterfeit protection image or code. These are commonly seen on credit cards and often take the form of a hologram. Again, the counterfeit prevention hologram must be verified by a person. Though fraud prevention is an important aspect of credit card use and distribution, it does not address the need to provide privacy of information contained on a magnetic strip.

Reading and writing information to magnetic tape is well understood. Magnetic tape is used for audio recording, video recording, data storage, and magnetic strips. A review of technical knowledge relating to magnetic tape is available in *The Complete Handbook of Magnetic Recording* 4th Edition By Finn Jorgensen McGraw Hill 1996 which is hereby incorporated by reference.

In U.S. Pat. No. 5,777,903 for a Solar Cell Powered Smart Card with Integrated Display and Interface Keypad issued to Piosenka et al. on Jul. 7, 1998 and hereby incorporated by reference, a solar powered smart card is disclosed. The use of solar power is advantageous for portable devices as is well known. The invention allows a smart card that incorporates its own power source.

It would be advantageous to provide a secure magnetic strip that can not be read absent authorisation.

SUMMARY OF THE INVENTION

It is an object of the invention to provide a method and apparatus for securing information stored on a magnetic strip of a card.

A method of securing information stored within a magnetic strip is provided. An amorphous film is disposed on top of magnetic strip. The amorphous strip is selected such that it is capable of operating in each of two states. In a first state, the amorphous thin film has a large enough molecular dipole moment to induce a significant local electromagnetic field, preventing access to information contained within the magnetic strip. A biometric authorisation process is used to identify a user of the magnetic strip. When the user is authorised, the thin amorphous film is operated in a second state. The second state is characterised by a change in the overall dipole orientation of the amorphous strip, which enables reading of information stored within the magnetic strip.

A photovoltaic cell and rechargeable battery co-operate to ensure sufficient power for a processor, for visual indications, and for maintaining the orientation of the dipoles as required for at least one of the two states.

BRIEF DESCRIPTION OF THE DRAWINGS

Exemplary embodiments of the invention will now be described in conjunction with the drawings, in which.

DETAILED DESCRIPTION OF THE INVENTION

The present invention relates to a card having a magnetic strip that is secured from unauthorised access. The card comprises a processor and a magnetic strip. Thin cards having electronic circuitry therein are well known. Examples include PCMCIA cards, smart cards and so forth. Commonly, the electronic circuitry is used for storing data and for providing some on-card functionality. According to the invention, the electronic circuitry is used to control masking and unmasking of information on the magnetic strip affixed to the card. The control is performed in dependence upon an authorisation function. The authorisation function is commonly in the form of a user identification. User identification is well known in the art of computer security. User identification is performed, for example, using a PIN or biometric information such as a voice print, a fingerprint and so forth. Of course, an authorisation function dependent upon information from an external source such as an automatic teller machine (ATM) or a magnetic strip reader provided by the credit card companies is also possible.

Figure 1:
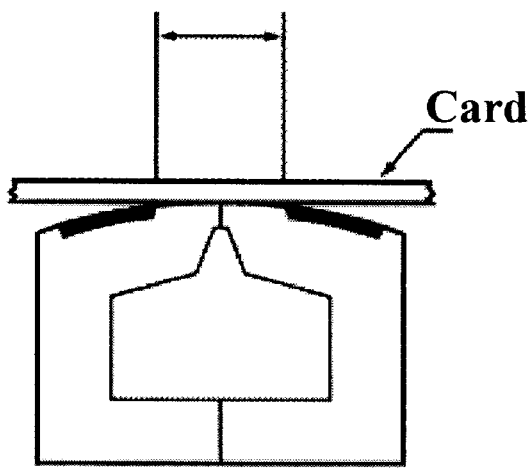
FIG. 1 is diagram illustrative of principles of the magnetic card reading.
Figure 1:
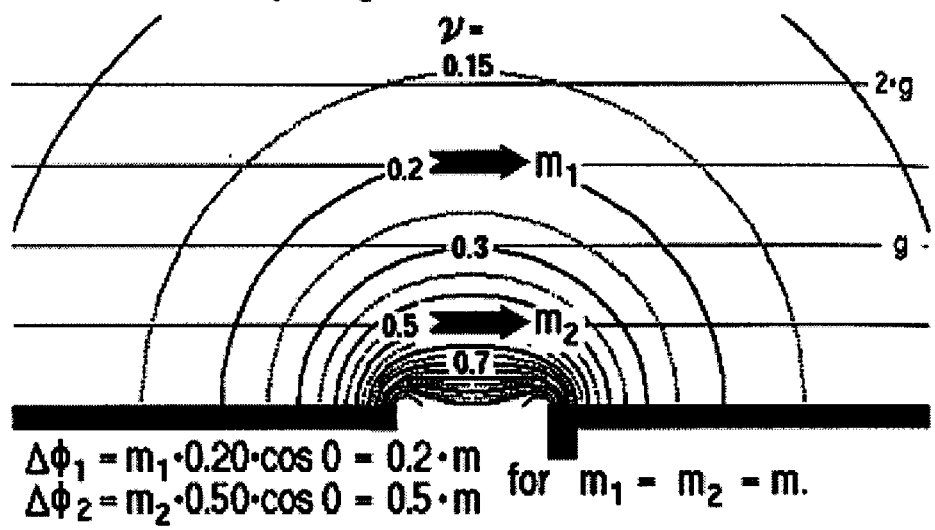

Referring to FIG. 1, the general principle of the magnetic strip reading is illustrated. A magnetic field is produced by a magnetic reading head. A magnetic strip passing through the magnetic field affects it and the changes to the magnetic field are measured. Generally, there are two essential parameters to be considered for design of magnetic strips and readers—magnetic strip material and a distance between a magnetic strip and a magnetic reading head during reading and writing thereof. Of course, any suitable magnetic strip material and distance is useable with the invention.

Figure 2:
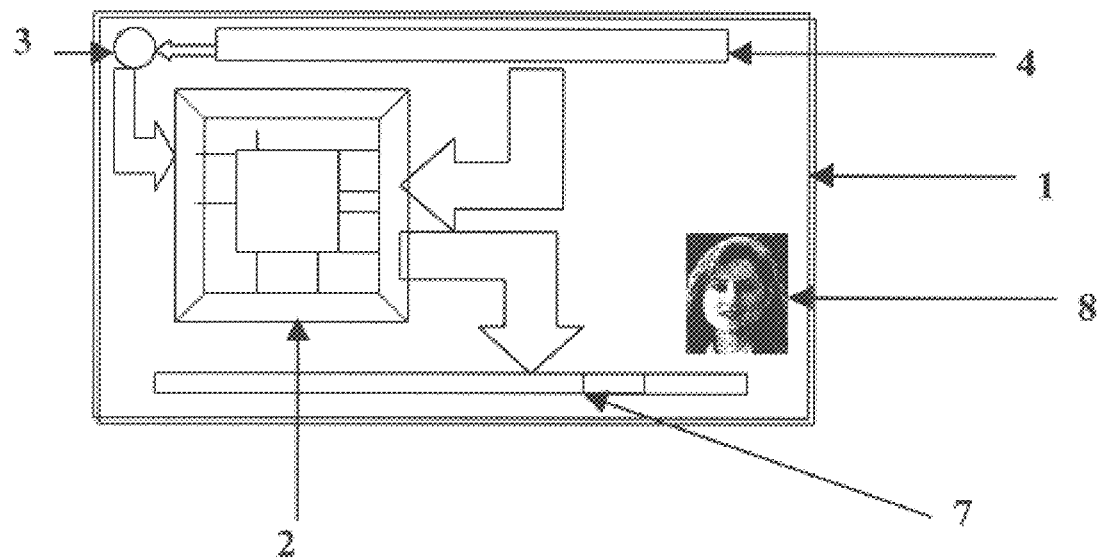
FIG. 2 is a front view of a card according to the invention.

Referring to FIG. 2, a front view of a card 1 according to the invention is shown. Preferably, the card complies with industry standards such as the ISO 7816-1 standard and/or the EMV (Europay, Mastercard, Visa) standard. The card 1 comprises a processor 2 including data storage and a controller. Optionally, the data storage and the controller form circuitry external to the processor for working in conjunction with the processor. A photovoltaic power strip 4 in the form of a flexible solar battery for converting light into electricity is disposed on the card 1. Preferably, the photovoltaic strip provides sufficient power for powering the processor 2. Optionally, an indicator 7 indicates when security is enabled within the card 1. Optionally, the indicator 7 also indicates when sufficient power exists for powering circuitry within the card 1. The power indicator 7 is useful for warning when power is below a certain threshold. As is evident from the description below, it is important that sufficient power exist in the card 1 in order to maintain security.

A biometric input transducer in the form of a microphone 3 is used to provide biometric information for use in identification of a user of the card 1. Microphones of a quality and size for on card applications are well known in the art. Alternatively when biometric information is not used, a keypad is disposed on the card 1 for allowing input of a PIN. Optionally, a security image is disposed on the card 1 in the form of an image of an authorised user 8 or an image for fraud prevention such as a hologram (not shown). In a further alternative embodiment, no data entry transducer is provided on the card 1.

Figure 3:
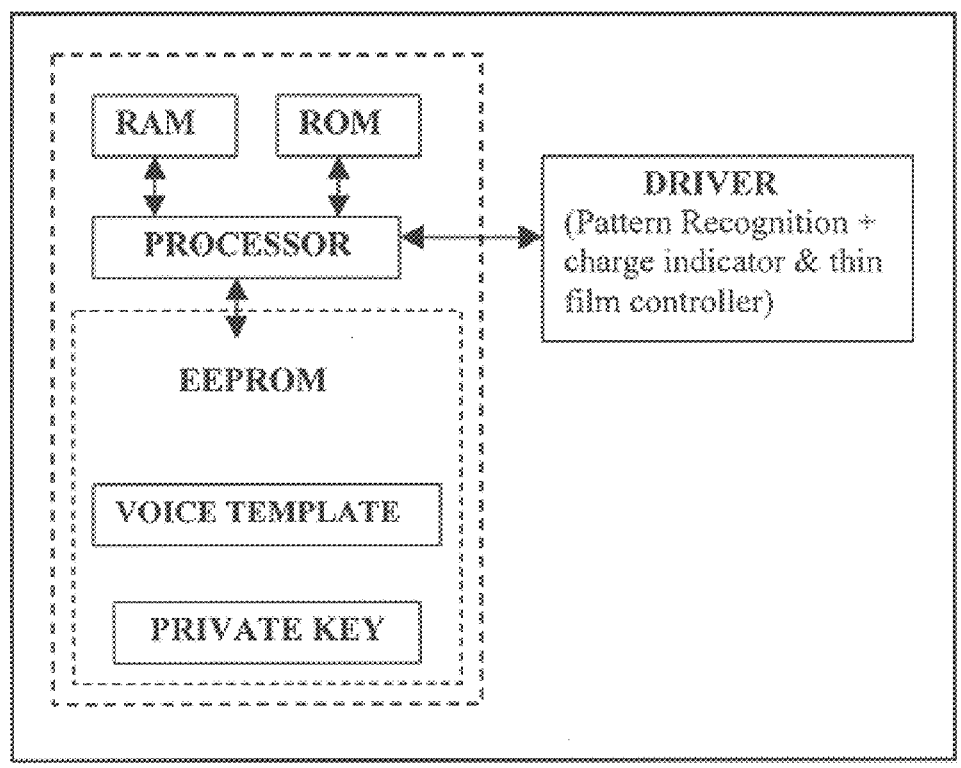
FIG. 3 is a simplified block diagram of the architecture of the electronics including the firmware.

Referring to FIG. 3, a block diagram of circuitry within the card 1 is shown. The circuitry is for use in a card according to the invention using voice recognition as a method of user authorisation. The processor is coupled to erasable programmable read-only memory (EEPROM). Power is supplied to the circuitry from a rechargeable battery charged by the photovoltaic strip 4 (shown in FIG. 2). Within random access memory (RAM) are stored executable commands for performing user identification and for controlling a security system. User identification is performed by the processor using biometric information provided to the microphone 3 (shown in FIG. 2) and a voice template. The voice template is stored within the EEPROM.

In operation, a user provides a voice sample to the microphone. The voice sample is digitised and then information is extracted from the sample. For example, frequency information is extracted using an FFT algorithm. The information is then compared to stored templates previously stored in the EEPROM. When a match occurs, the user is identified as an authorised user. The processor, based on the identification result, temporarily removes security from the magnetic strip. The security for the magnetic strip is described below. Since there is one template stored within the card, an entire verification process is fast. Even when more templates are stored, the verification process is relatively quick. The biometric template as well as a private key are stored on the card by a smart card reader/writer. Alternatively, another method of storing template data is used. Typically, the biometric template information comprises a small amount of information.

Within the EEPROM is also stored an encryption key. The key secures information that is stored within the card such as the voice template. According to an embodiment, the encryption key is also used to allow magnetic strip reader systems to authorise access to information within the magnetic strip 5. In this way, for example, hospitals and financial institutions can access information within the magnetic strip absent user authorisation.

Figure 4A:
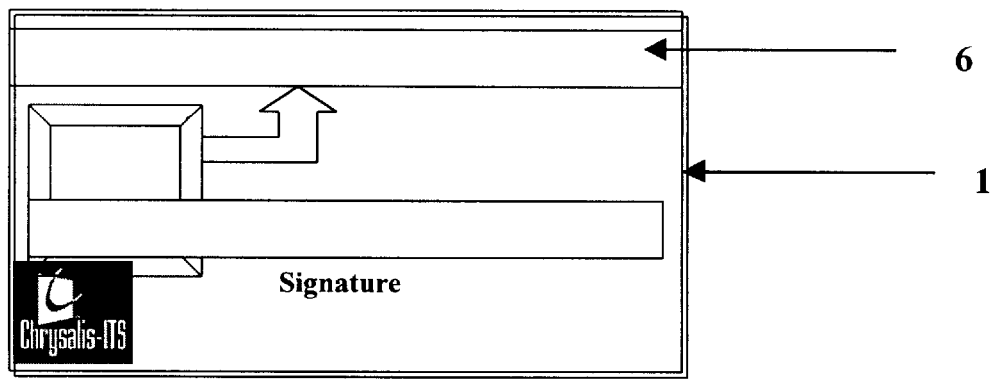
FIG. 4 is a back view of a card according to the invention.
Figure 4B:
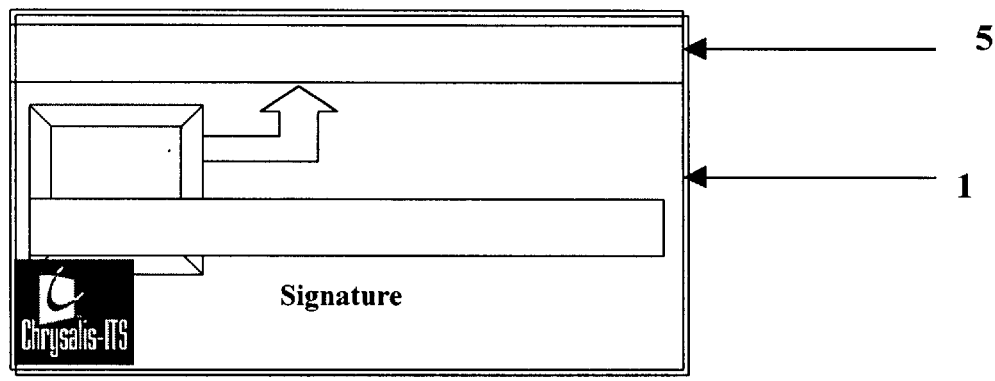

Referring to FIG. 4, a back view of the card 1 is shown. A magnetic strip 5 is coated with an amorphous layer 6 in the form of a thin film having a dipole moment that is sufficient to interfere with the magnetic strip in a first state and capable of allowing information within the magnetic strip to be accessed in a second other state. For example, the thin amorphous film 6 is formed of $SiO_2$ or $InO_2$. Preferably, the amorphous film 6 changes its average dipole orientation in dependence upon a presence of an electric field. The card 1 is covered by a protective coating which protects the amorphous material 6 disposed on top of magnetic strip 5 protects the card from any mechanical damages. The amorphous layer 6 is driven by the controller via two electrodes 10 (shown in FIG. 5). One electrode 10 acts as an anode and the other as a cathode. When energy is provided to the electrodes 10, the amorphous layer is turned on and interferes with accurate reading of the information stored within the magnetic strip 5.

Alternatively, a liquid crystal having similar properties is used in place of the amorphous material 6.

Figure 5:
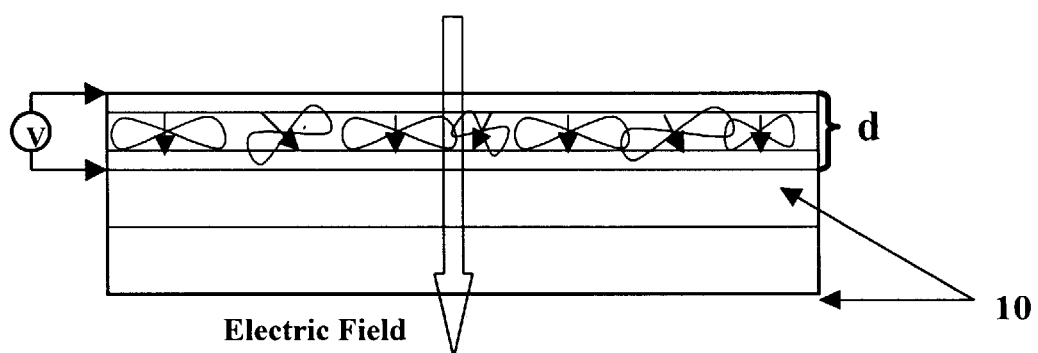
FIG. 5 is a side cross-sectional view demonstrating the change in dipole orientation of an amorphous thin film in the presence of an electric field; and, FIG. 6 is a side cross-sectional view demonstrating the change in dipole orientation of cells of an amorphous thin film in the presence of a plurality of different electric fields.

Referring to FIG. 5, a local field distribution of the thin film 6 is shown when power is applied to the electrodes. Ideally, all dipoles are oriented perpendicular to the surface, however due to molecular interactions, there is a distribution of orientation with an average dipole vector perpendicular to the surface. Because of a dense molecular packing there is an overlap in such a dipole distribution and the entire space in between the electrodes is cover by a "dipole cloud". When power is no longer provided to the thin amorphous film 6, then the dipoles return to an initial state and the resulting average field is zero. Depending on a selected material, the reorientation time, referred to as dipole moment relaxation time, differs. For some liquid crystals this reorientation is relatively fast while for others it is slower.

Two electrodes 10, shown in FIG. 5, are disposed on either side of thin film 6. When an electric field is applied then overall the dipoles of the film are oriented perpendicular to the surface of the card, which introduces a field sufficient to distort the local field and make the information stored within the magnetic strip 5 unreadable. The larger the dipole moment of the amorphous film 6, the larger the local field distortion. When verification is successful, the power to the electrodes 10 is switched off and the dipoles within the thin amorphous film 6 are randomly oriented, the average electromagnetic field inside the amorphous film 6 is minimal, theoretically zero, and the information within the magnetic strip 5 is accessible. Thus, the information within the magnetic strip is blocked in a first state of operation of the card until successful verification occurs.

Since close contact between the magnetic strip 5 and a magnetic strip reading head is required, a distance d between the magnetic strip and the magnetic reading head (shown in FIG. 1) is a significant design parameter. Another parameter is the value of the dipole moment of the thin film 6. Since the dipole moment varies for different materials and the cost of the film is likely a consideration, then the parameter d is somewhat dependent upon a selected application.

By calculating a local field of a known material for use as the thin film 6 and knowing the induced magnetic field of a suitable magnetic strip reader, the distance d is easily estimated. Suitable testing and experimentation will establish tolerances for use of a card in any particular application.

As is evident, it is preferable that the thin amorphous film is substantially thin and substantially low cost.

Using a method according to the invention, sensitive data in the form of medical data or financial data can be stored on a magnetic strip. Because access is prevented until authorisation occurs, the information is not readily accessible. Since smart cards having significant memory capacity such as the smart card from AMMI Corporation having a 4 Mbit cache memory, are currently available, it is advantageous to provide security against access to the information in the magnetic strip 5.

Advantageously, the present invention provides secure storage of information on a magnetic strip. This is useful in many applications. Financial and/or medical information is easily stored on a magnetic strip. Using the present invention, privacy is maintained and information storage and retrieval is not severely limited. Further, because of the increased privacy, magnetic strips become more useful, for example, for storing diagnoses, prescriptions, allergies and so forth. Preferably, when used for medical information hospitals are provided with a method of authorising data access so that during an emergency, the information is accessible. Alternatively, due to memory limitations of current magnetic strips, identifiers for identifying data locations within a database are stored in the magnetic strip. This allows large volumes of data to be accessed at an indexable location identified by the data stored within the magnetic strip.

Further, a card with a magnetic strip according to the invention is more secured against fraud and theft than conventional cards. This is advantageous.

According to an embodiment of the invention, the card is also provided with an eraser for permanently altering information within the magnetic strip 5. Such an eraser need not erase the contents of the magnetic strip as alteration of those contents in a purposeful fashion will render those contents of little or no use. The use of an eraser prevents access to information stored within the magnetic strip when power to the device is insufficient to provide an electric field sufficient for the purposes of aligning the dipoles within the thin film and thereby interfering with the contents of the magnetic strip.

Alternatively, in place of voice print analysis or fingerprint analysis, dynamic signature analysis—another form of biometric information—is used. Dynamic signature analysis analyses a signature and the actual process of signing. A signature is provided on a contact imager and the signature, speed of signing, stroke timing and so forth is analysed according to known algorithms. These are known in the art of dynamic signature analysis.

Figure 6:
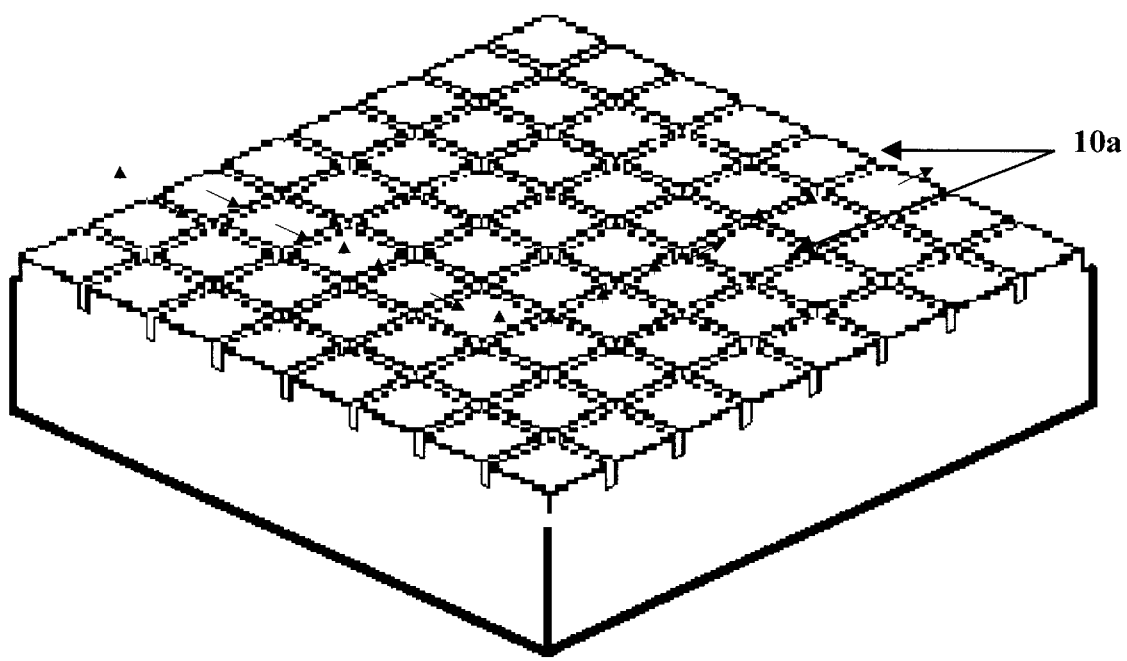

In an alternative embodiment shown in FIG. 6, the electrode pairs 10 are split into many different cells 10a each of which is independently controlled. Controlling of a single independent cell controls the dipole orientation of an area within the thin layer corresponding with a single bit of data within a magnetic strip. No magnetic strip is disposed on the card below the thin layer. When in a first state, the dipole orientation is random and, therefore, no data is readable by a magnetic strip reader. When authentication has occurred, data for controlling the independent cell controls is extracted from memory within the card and the cells are each driven appropriately such that the thin layer is readable by a magnetic strip reader. The resulting card is highly secure since power must be applied by the controllers to the thin layer in order to allow reading of information therefrom. The use of encryption to secure the data within the memory of the card acts to prevent tampering and unauthorised access.

According to this embodiment, a plurality of different magnetic strip data values can be driven, one at a time. Used with voice recognition, a keypad or another data input device allowing selection between different data sets, a user selects which values to provide to the thin layer. This allows a single credit card, for example, that is secure and in which is stored all credit card information and other magnetic strip data of an individual. The resulting card is very useful as a spare for travel, to reduce a number of cards necessary, for convenience and so forth. Of course, security is maintained since only an authorised user can unlock the data so it is provided to the thin layer in accordance with the invention.

In operation, a user is provided with a device for interfacing with smart cards and for reading magnetic strips. They insert a card according to the present embodiment. The user then swipes magnetic strips of each card in their wallet through the magnetic strip reader. They identify each swiped card and, when the card is provided with an LCD display, provide other pertinent information for display. The information is stored within the smart card according to the invention. Once this process is completed, a user with the smartcard has access to all their credit cards, their bank cards, their health cards, and so forth. The convenience and ease of use is a significant advantage. Also, because of the security, loss of the card is less problematic than loss of credit cards which are easily used for telephone shopping, self serve gas pumps, and so forth.

Numerous other embodiments of the invention may be envisioned without departing from the spirit or scope of the invention.

What is claimed is:

1. A card comprising:
    a magnetic strip;
    a layer of material disposed over the magnetic strip, the layer, in a first state having a first average dipole orientation and in a second state having a second average dipole orientation; and
    a control circuit coupled to control the states of the layer of material wherein in the first state the layer substantially interferes with reading of information stored within the magnetic strip and in the second state the layer substantially allows reading of information stored within the magnetic strip.

2. The card according to claim 1 wherein the control circuit is for controlling an electric field for affecting the average dipole orientation within the layer and the layer substantially prevents reading of the magnetic strip when a first amount of energy is provided thereto and allows reading of the magnetic strip when a second other amount of energy is provided thereto.

3. The card according to claim 2 wherein the layer is a layer of thin amorphous material.

4. The card according to claim 2 wherein the layer is a layer of liquid crystal material.

5. The card according to claim 1 wherein the layer is a layer of thin amorphous material.

6. The card according to claim 1 wherein the layer is a layer of liquid crystal material.

7. The card according to claim 1 further comprising:
    a data input terminal for receiving user authorisation data; and
    a processor for verifying the user authorisation data against a previously stored authorisation template, and for providing a comparison result,
wherein the controller controls the state of the layer in dependence upon the comparison result.

8. The card according to claim 7 wherein the data input terminal is a microphone.

9. The card according to claim 7 wherein the data input terminal is a contact imaging device.

10. The card according to claim 1 further comprising:

a port for receiving authorisation information; and a processor for verifying the authorisation data against a previously stored authorisation template and for providing a comparison result, wherein the controller controls the state of the layer in dependence upon the comparison result.

11. A card comprising:

a magnetic strip;

a layer of material disposed over the magnetic strip, the layer, in a first state having a first average dipole orientation and in a second state having a second average dipole orientation;

a port for receiving authorisation information;

a rechargeable battery;

a photovoltaic cell electrically coupled with the battery, the photovoltaic cell for charging the battery; and a control circuit coupled with the battery for verifying the authorisation data against a previously stored authorisation template and for generating an electric field for affecting the average dipole orientation within the layer to switch the layer between states in dependence upon the comparison result, wherein in a first state the layer substantially interferes with reading of information stored within the magnetic strip and in a second state the layer substantially allows reading of information stored within the magnetic strip.

12. The card according to claim 11 wherein the port comprises a microphone.

13. The card according to claim 11 wherein the authorisation template comprises an encrypted authorisation template and an encryption key.

14. A card comprising:

a layer of material disposed proximate an outer surface of the card, the layer divided into cells, each cell in a first state having a first average dipole orientation and in a second state having a second average dipole orientation; and a control circuit coupled with the layer for independently controlling the state of cells within the layer of material for affecting the dipole orientation within each cell, wherein in a first state the layer comprises magnetic strip data for reading by a magnetic strip reader.

15. The card according to claim 14 wherein the controller is for controlling an electric field within each cell for affecting the average dipole orientation within the portion of the layer within the cell, wherein when an electric field of substantially 0 is applied, no data is readable from a cell and wherein when a non zero electric field is applied a data bit is readable from a cell.

16. The card according to claim 15 wherein the layer is a layer of thin amorphous material.

17. The card according to claim 15 wherein the layer is a layer of liquid crystal material.

18. The card according to claim 14 wherein the layer is a layer of thin amorphous material.

19. The card according to claim 14 wherein the layer is a layer of liquid crystal material.

20. The card according to claim 14 further comprising:

a port for receiving authorisation data; and a processor for verifying the authorisation data against a previously stored authorisation template and for providing a comparison result, wherein the controller controls the state of the layer in dependence upon the comparison result.

21. The card according to claim 20 wherein the port comprises a data input terminal and the authorisation data comprises user authorisation data.

22. The card according to claim 21 wherein the data input terminal is a microphone.

23. The card according to claim 21 wherein the data input terminal is a contact imaging device.

* * * * *